United States Patent
Miyake

(10) Patent No.: US 8,089,636 B2
(45) Date of Patent: Jan. 3, 2012

(54) INSPECTING SYSTEM AND INSPECTING METHOD

(75) Inventor: Atsushi Miyake, Nishinomiya (JP)

(73) Assignee: KDE Corporation, Osaka (JP)

( * ) Notice: Subject to any disclaimer, the term of this patent is extended or adjusted under 35 U.S.C. 154(b) by 0 days.

(21) Appl. No.: 12/889,124

(22) Filed: Sep. 23, 2010

(65) Prior Publication Data

US 2011/0069320 A1    Mar. 24, 2011

(30) Foreign Application Priority Data

Sep. 24, 2009 (JP) ................. 2009-218686

(51) Int. Cl.
*G01B 11/24* (2006.01)

(52) U.S. Cl. ............. 356/612; 356/601; 356/239.1

(58) Field of Classification Search .... 356/237.1–237.5, 356/601–613, 239.1–239.3, 445; 219/121.62, 219/121.83; 438/222.1
See application file for complete search history.

(56) References Cited

U.S. PATENT DOCUMENTS

| | | | |
|---|---|---|---|
| 6,281,470 B1 * | 8/2001 | Adachi | 219/121.62 |
| 7,471,383 B2 * | 12/2008 | Ehrick | 356/239.1 |
| 7,495,760 B2 * | 2/2009 | Miyake et al. | 356/239.1 |
| 7,589,844 B2 * | 9/2009 | Hirata et al. | 356/601 |

FOREIGN PATENT DOCUMENTS

| | | |
|---|---|---|
| JP | 11-257930 A | 9/1999 |
| JP | 2002-323454 A | 11/2002 |
| JP | 2009-180690 A | 8/2009 |

* cited by examiner

*Primary Examiner* — Sang Nguyen
(74) *Attorney, Agent, or Firm* — Alleman Hall McCoy Russell & Tuttle LLP

(57) ABSTRACT

An object of the present invention is to apply a phase shift method to a workpiece having a rough surface to accurately detect an abnormal concave-convex irregularity. Therefore, in an inspecting system of the present invention, an image of a stripe pattern reflected on an inspection target surface is detected at a shallow angle, and one or more continuous unit stripes of a unit stripes reflected image is specified among the stripe pattern reflected images existing in a predetermined distance range counted from the edge in a closer side to the workpiece. Then, the phase of the specified unit stripes reflected image is varied to apply a phase shift method and scan the inspection target surface with the unit stripes reflected image to thereby detect the abnormal concave-convex irregularity.

10 Claims, 7 Drawing Sheets

INSPECTING SYSTEM AND INSPECTING METHOD

CROSS REFERENCE TO RELATED APPLICATIONS

This application claims priority to Japanese Patent Application No. JP2009-218686, entitled "INSPECTING SYSTEM AND INSPECTING METHOD", filed Sep. 24, 2009, which is hereby incorporated by reference in its entirety for all purposes.

TECHNICAL FIELD

The present invention generally relates to an inspecting technique, and in particular to an inspecting system and an inspecting method for extracting abnormal concave-convex irregularities in an inspection target surface of a workpiece having a rough surface such as that of a steel plate, a resin part, and the like.

BACKGROUND ART

It is difficult to detect abnormal concave-convex irregularities in a workpiece such as a steel plate, a resin molded component, etc., having a rough surface by which an irradiation light is reflected in dispersion. For example, in the case of a steel plate, a method exists in which a streak caused at a time of rolling is first detected and then concave-convex irregularities are detected by irradiating lights in parallel, perpendicular to the streak. However, there is a limitation in the accuracy of such detection.

Meanwhile, an inspecting apparatus capable of detecting defects (e.g., abnormal concave-convex irregularities) in a surface of a workpiece with high accuracy is disclosed in JP2002-323454A, in which a plurality of reflected images of a stripe pattern are detected with a phase shift. In such a case, the abnormal concave-convex irregularities are detected by applying a phase shift method to the plurality of detected images.

SUMMARY OF THE INVENTION

Technical Problem

However, since the above-described phase shift method needs reflected images of a stripe pattern that are as clear as possible without deformation, this method is conventionally used only for a workpiece having a flat surface of a mirror-surface state by which irradiation lights are regularly reflected, and it is regarded difficult to apply the method to a workpiece having a rough surface, such as steel plates, resin molded components etc. In addition, the surfaces of steel plates, resin molded components, etc., are curved in many cases, and this may further render the traditional phase shift method inapplicable.

Therefore, the present invention has been made to solve this problem by overcoming conventional wisdom, and makes it possible to detect abnormal concave-convex irregularities in workpieces having a rough surface with high accuracy by skillfully arranging and shifting a stripe pattern and an image detection device, and applying well-devised image processing to thereby apply a phase shift method to the rough surface of the workpiece.

Solution to Problem

Accordingly, an inspecting system according to the present invention is a system for inspecting abnormal concave-convex irregularities in an inspection target surface defined in a surface of a workpiece, such as that of a steel plate, a resin component, etc. The system includes: a display part adapted to display a stripe pattern of periodically continuous unit stripes each of which is formed of linear bright and dark portions having a constant width; image detection means adapted to detect the stripe pattern reflected on the inspection target surface; holding means adapted to hold the display part so that an extending direction of the unit stripes is substantially in parallel to the inspection target surface and to hold the image detection means so that an optical axis of detecting the image is diagonal to the inspection target surface; a relative position setting part adapted to drive the holding means or the workpiece to change the relative position thereof to be multiple; a specifying part adapted to specify a unit stripes reflected image, which is a reflected image of one or more continuous unit stripes, selected among the reflected images existing in a predetermined distance range counted from an edge in a closer side to the workpiece in a stripe pattern reflected image which is a reflected image of the stripe pattern in each of the relative positions; a phase shifting part adapted to shift a reflected position of the stripe pattern reflected on the inspection target surface by 1/n periods when viewed from the detection means in each of the relative positions, wherein n is an integer of two or more; and an image processing part adapted to determinably output abnormal concave-convex irregularities within the inspection target surface based on the unit stripes reflected image in each phase in each of the relative positions, wherein the relative position setting part sets each of the relative positions so as to cover the inspection target surface with the unit stripes reflected image specified in each of the relative positions.

An inspecting method according to the present invention is a method of inspecting abnormal concave-convex irregularities in an inspection target surface defined in a surface of a workpiece, wherein: a display part is adapted to display a stripe pattern of periodically continuous unit stripes each of which is formed of linear bright and dark portions having a constant width; an image detection means is adapted to detect the stripe pattern reflected on the inspection target surface; and a holding means is adapted to hold the display part so that an extending direction of the unit stripes is substantially in parallel to the inspection target surface and to hold the image detection means so that an optical axis of detecting the image is diagonal to the inspection target surface. The method includes: setting a relative position by driving the holding means or the workpiece to change the relative position thereof to be multiple; specifying a unit stripes reflected image of one or more continuous unit stripes selected among reflected images existing in a predetermined distance range counted from an edge in a closer side to the workpiece in a stripe pattern reflected image in each of the relative positions; performing a phase shifting to shift a reflected position of the stripe pattern reflected on the inspection target surface by 1/n periods when viewed from the detection means in each of the relative positions, wherein n is an integer of two or more; and performing image processing to determinably output abnormal concave-convex irregularities within the inspection target surface based on the unit stripes reflected image in each phase in each of the relative positions, wherein, setting the relative position comprises setting each of the relative positions so as to cover the inspection target surface with the unit stripes reflected image specified in each of the relative positions.

As a specific aspect of the phase shifting part, by changing the position of the image detection means or the display part, the reflected position of the stripe pattern reflected on the inspection target surface may be shifted by 1/n periods, wherein n is an integer of two or more.

Alternatively, the display part may be adapted to have a plurality of arrays of light emitting elements such as light-emitting diodes (LEDs), etc., to set bright and dark patterns of the light emitting elements every array thereby to display the stripe pattern. The phase shifting part may be adapted to shift the reflected position of the stripe pattern reflected on the inspection target surface by 1/n periods by periodically changing the bright and dark patterns of the light emitting elements in time basis every array, wherein n is an integer of two or more. By this arrangement, the reflected position can be shifted at a high speed with high accuracy so that the inspecting time can be reduced and the inspection accuracy can be improved.

Herein, regarding a specific aspect of an operation of "determinably outputting abnormal concave-convex irregularities" in the image processing part or during image processing within the method, there may be considered various aspects, for example: a case of outputting an abnormal concave-convex irregularity as an image; a case of outputting information of a position and a size of an abnormal concave-convex irregularity; a case of outputting an abnormal concave-convex irregularity as a distortion of a triangular wave or a sine wave; a case of outputting only existence or non-existence of an abnormal concave-convex irregularity; and so forth. A destination of the output is a screen or a printer when a determiner is an operator, and, for example, if an extracting machine for extracting a defective workpiece is situated in a subsequent process, the destination of the output is control equipment and the like of the subsequent process.

Various methods may be adopted as the bright and dark variation of the stripe pattern and the phase shift method, and, in consideration of the results obtained by practical experiences and examination made by the present inventor, it is preferable that the brightness of the bright and dark portions in the stripe pattern is varied in a manner of a sinusoidal waveform in a widthwise direction, and that the reflected position of the sinusoidal waveform stripe pattern is shifted by ¼ periods to be varied to four phases of an A phase, a B phase, a C phase and a D phase in each period, thereby applying a four-phase shifting method to calculate the abnormal concave-convex irregularity based on the images of the four phases.

It is preferable that the angle defined by the inspection target surface and the optical axis of detecting the image of the image detection means is 10 degrees or smaller in the case of a resin injection molding, and in particular 5 degrees or smaller is desirable in the case of a steel plate.

In the case where the inspection target surface is slightly curved, it is preferable that the display part is arranged so that an extending direction of the unit stripe reflected on the inspection target surface is substantially perpendicular to a non-curved direction in the curved surface.

As to what portion of the unit stripes reflected image counting from the edge of the stripe pattern should be specified, a constant number of unit stripes reflected images internally positioned by a predetermined constant number of pixels may be used, or may be automatically decided for every image detection operation. Therefore, it is preferable that the specifying part is configured so as to specify the reflected images of one or more continuous unit stripes of a plurality of unit stripes to be displayed more clearly above a predetermined level.

ADVANTAGEOUS EFFECTS OF INVENTION

According to the present invention configured as described above, since the image detection means detects an image in a diagonal direction (i.e., at a low angle), the reflectance from the inspection target surface can be improved to obtain a reflected image of a stripe pattern which is as clear as possible. Meanwhile, instead of utilizing the whole area of the stripe pattern reflected image, the unit stripes reflected image which is a portion applicable of a phase shift method in the images is extracted and specified, and the specifying operation is repeated every variation while the relative position of the holding means related to the workpiece is consecutively varied to thereby scan the entire inspection target surface. Therefore, even if the inspection target surface is rough and curved, abnormal concave-convex irregularities can be detected with high accuracy by applying a phase shift method in this manner.

Further, since the light (image) from a portion closest to the inspection target surface of the stripe pattern is reflected by the inspection target surface at a shallowest angle and the reflectance at this portion becomes the maximum, the stripe pattern reflected image at the edge portion thereof, closer to the inspection target surface, is theoretically most clear among the images. However, in practice, the stripe pattern reflected image at the portion closest to the inspection target surface may not always be the most clear among the images due to influences of light diffracted from a side edge outside of the display part and a curve of the inspection target surface and the like.

Contrary to this, in the present invention, the specifying part is provided to selectively specify one or more continuous unit stripes reflected image among from the images existing in a predetermined distance range counted from the edge in a closer side to the workpiece in the stripe pattern reflected image, and therefore not only the unit stripes reflected image to which a phase shift method is surely applicable can be specified, but also, the specifying time thereof can be remarkably reduced compared to the case of specifying the unit stripes reflected images randomly among the whole stripe pattern reflected images.

DETAILED DESCRIPTION

The following describes embodiments of the present invention with reference to the accompanying drawings.

Figure 1:
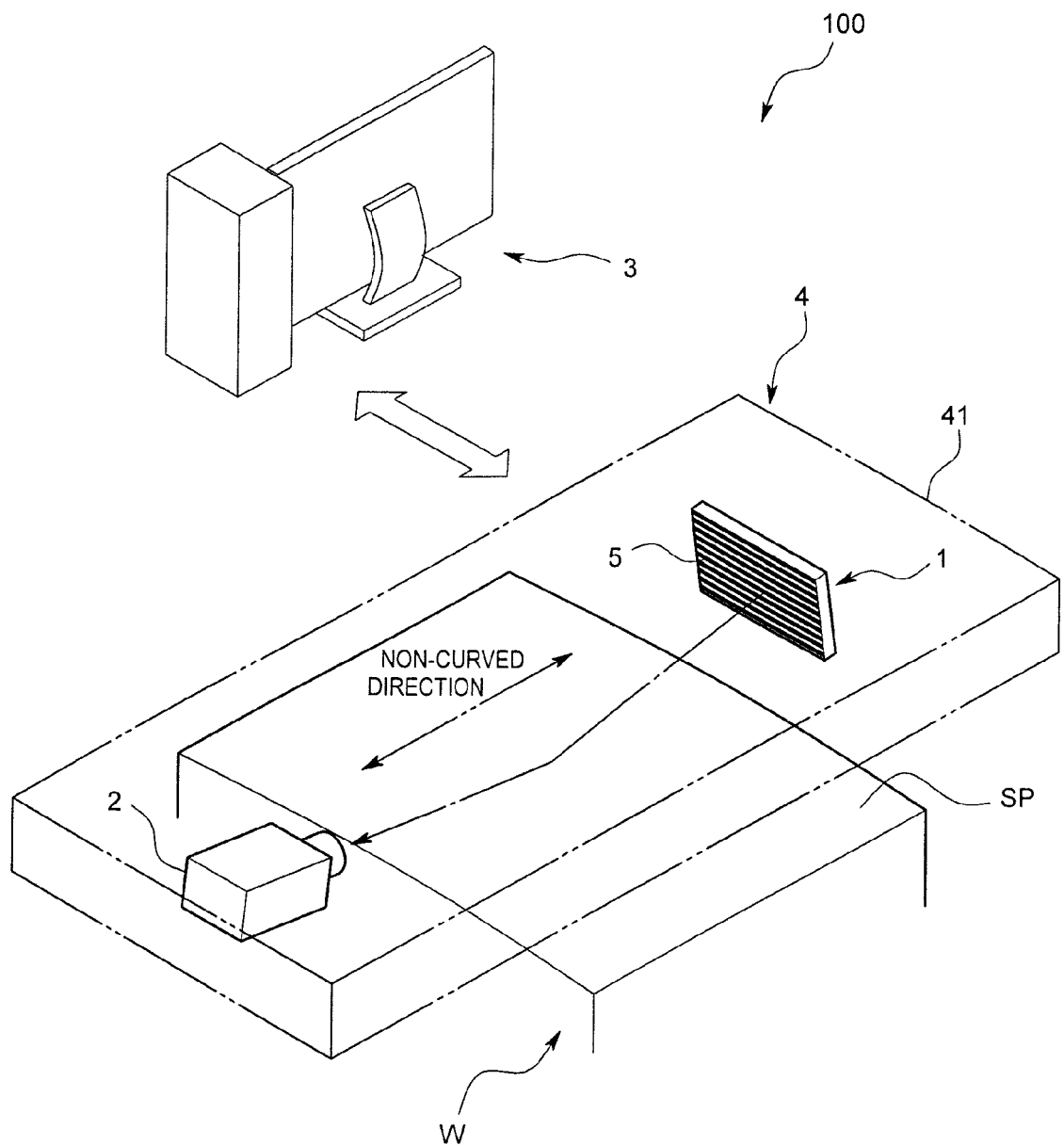
FIG. 1 is a perspective view of a whole part of an inspecting system according to one embodiment of the present invention.

As shown in FIG. 1, an inspecting system 100 according to the present invention is a system for inspecting abnormal concave-convex irregularities in an inspection target surface SP defined in a surface of a workpiece W such as a steel plate, a resin component, etc. The system 100 includes a display part 1 for displaying a stripe pattern 5, image detection means 2 adapted to detect an image of the stripe pattern 5 reflected onto the inspection target surface SP, holding means 4 adapted to integrally hold the display part 1 and the image detection means 2, and an information processing equipment 3 for determinably detecting abnormal concave-convex irregularities in the inspection target surface SP based on the reflected image P5 (shown in FIG. 5) of the stripe pattern 5 detected by the image detection means 2. Each part of the system 100 is explained in more detail as follows.

Figure 2:
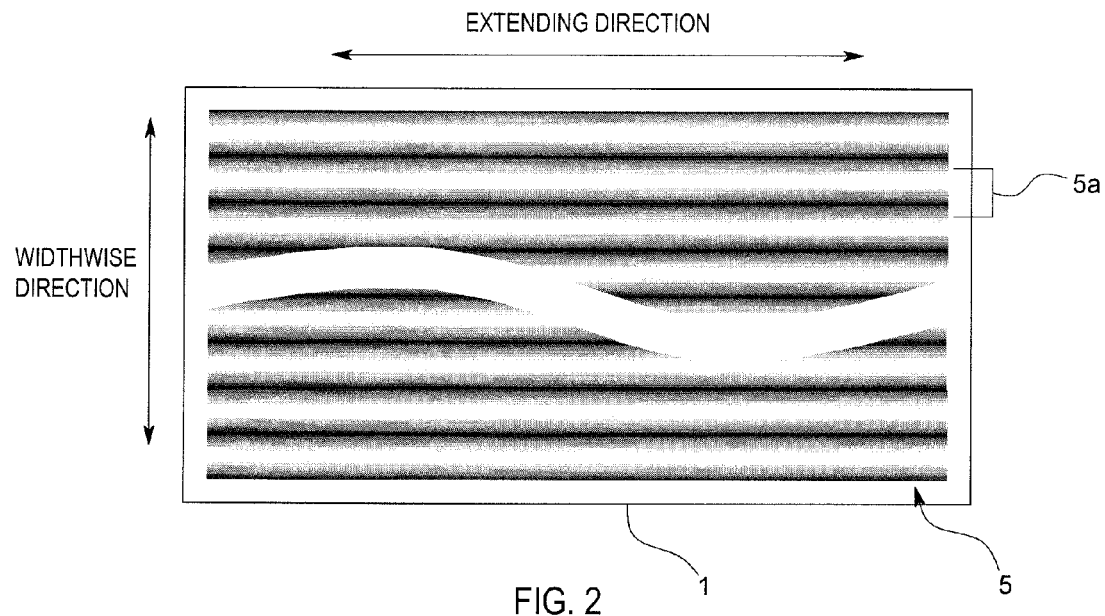
FIG. 2 is a front view of a stripe pattern in the embodiment of FIG. 1.

The display part 1 has a flat plate shape and, as shown in FIG. 2, displays the stripe pattern 5 of linear lines in parallel formed by repetition with a constant pitch of a unit stripe 5a of a bright zone and a dark zone formed on a faceplate portion of the flat plate. Herein, the stripe pattern 5 has its light and dark brightness varied in a manner of a sinusoidal waveform in a widthwise direction, and, for example, the stripe pattern 5 is so configured as to be luminous by a backlight which is built in a body of the display part 1. It is noted here that, if the brightness is sufficient and the image detection means 2 has a sufficient sensitivity, the stripe pattern 5 may be merely depicted on the faceplate portion without using a backlight and so forth.

The image detection means 2 is equipped with a built-in two-dimensional area sensor of, for example, several hundreds of thousands of pixels. It is noted that a one-dimensional line sensor may be used instead of the two-dimensional area sensor, and a function equivalent to that of the area sensor can be exerted by scanning the line sensor.

The holding means 4 holds the display part 1 and the image detection means 2 movably with respect to the workpiece W. More specifically, the holding means 4 includes, for example, a frame body 41 for integrally holding the display part 1 and the image detection means 2, and a support arm (not shown) for supporting the frame body 41. Thus, the frame body 41 can be moved by driving the support arm.

Figure 3:
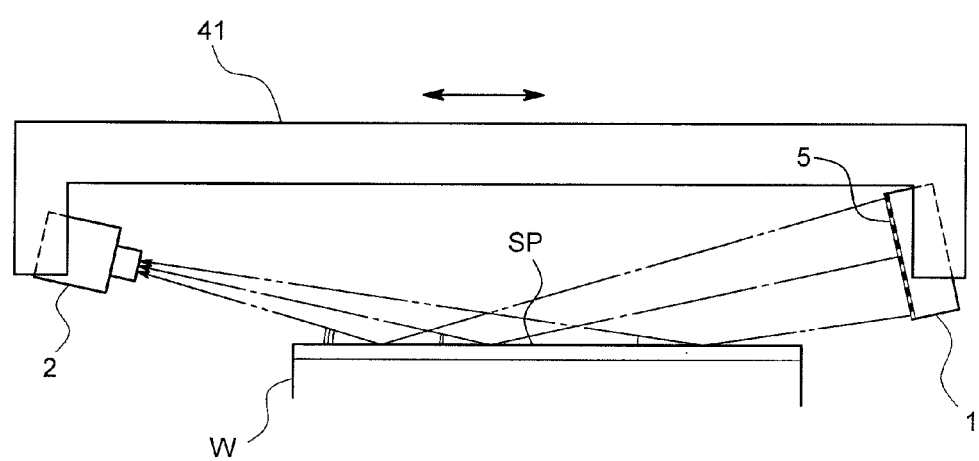
FIG. 3 is a schematic diagram of the inspecting system in the embodiment of FIG. 1 when viewed in a direction from a side thereof.

As shown in FIGS. 1 and 3, the frame body 41 is adapted to support the display part 1 and the image detection means 2 so as to be generally opposed to each other and spaced with a constant distance so that the light from the stripe pattern 5 impinges on the inspection target surface SP at a very shallow angle (approximately 3° to 10°) and the reflected light is thereby directed to the image detection means 2. Moreover, the frame body 41 is provided with a drive mechanism (not shown) for moving the display part 1 and/or the image detection means 2, typically in small increments with respect to the frame body 41. Thus, by moving the display part 1 and/or the image detection means 2 using the drive mechanism, the reflection position on the inspection target surface SP of the stripe pattern 5 to be detected by the image detection means 2 is moved only a distance corresponding to one period to several periods (i.e., one pitch to several pitches) in a width direction of the stripe pattern 5. It is noted that the frame body is not always necessary as the holding means for integrally holding the display part and the image detection means. For example, the display part and the image detection means may be individually supported by the arm so that the display part 1 and the image detection means 2 can be interlocked in synchronization with each other. As such, it should be appreciated that such a configuration is to be included within a range of integrally holding means in the present specification.

Figure 4:
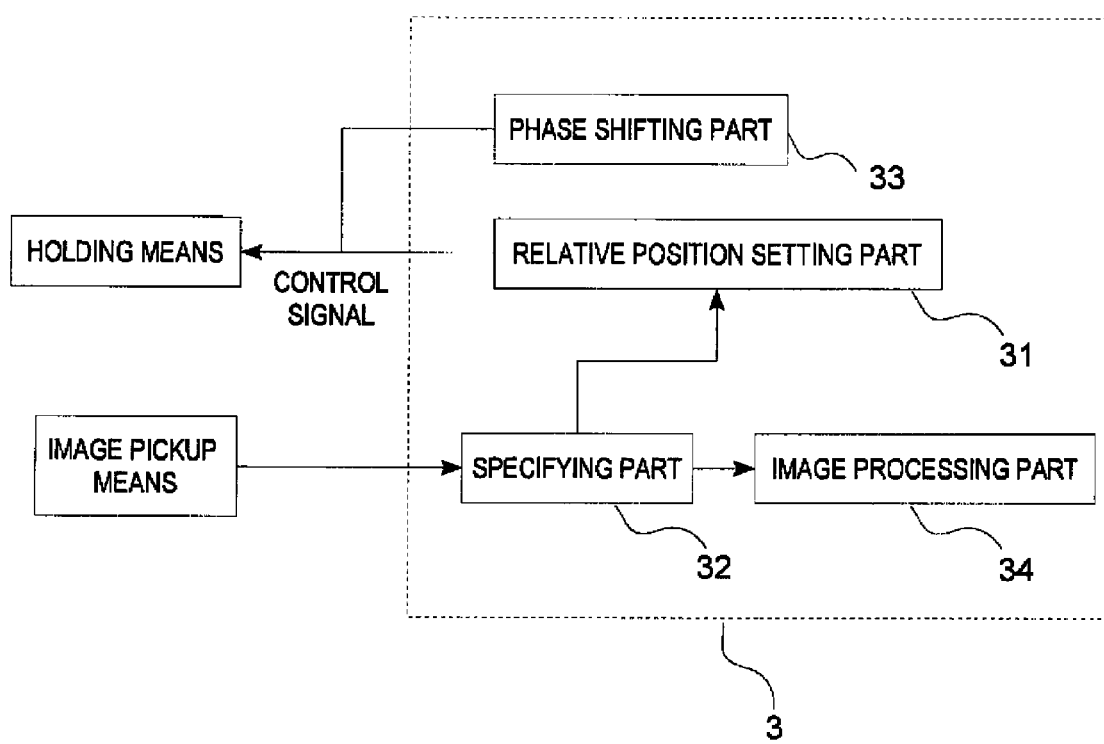
FIG. 4 is a functional block diagram of information processing equipment in the embodiment of FIG. 1.

The information processing equipment 3 physically includes a CPU, memory, an I/O port for communications and the like, and in the configuration shown in FIG. 1, the information processing equipment 3 is separately provided from the image detection means 2 and the display part 1. The CPU and peripheral equipments thereof cooperatively function in accordance with a program preset in a prescribed region of the memory to provide a relative position setting part 31, a specifying part 32, a phase shifting part 33, an image processing part 34, and the like, as shown in FIG. 4. It is noted that the information processing equipment 3 may not necessarily be configured physically as a single unit, and the functions may be performed by a plurality of interconnected computers, or the information processing equipment 3 may be built, for example, in the image detection means 2.

Next, an operation of the inspecting system 100 is described below together with explanations of functions of respective parts of the information processing equipment 3 with reference to FIG. 6. Herein, it is assumed that the workpiece W has, for example, a convex surface (inspection target surface SP) slightly curved in one direction as shown in FIG. 1. The roughness of this surface SP is considerably rough, and there may be included a plurality of streaks in some cases.

Figure 6:
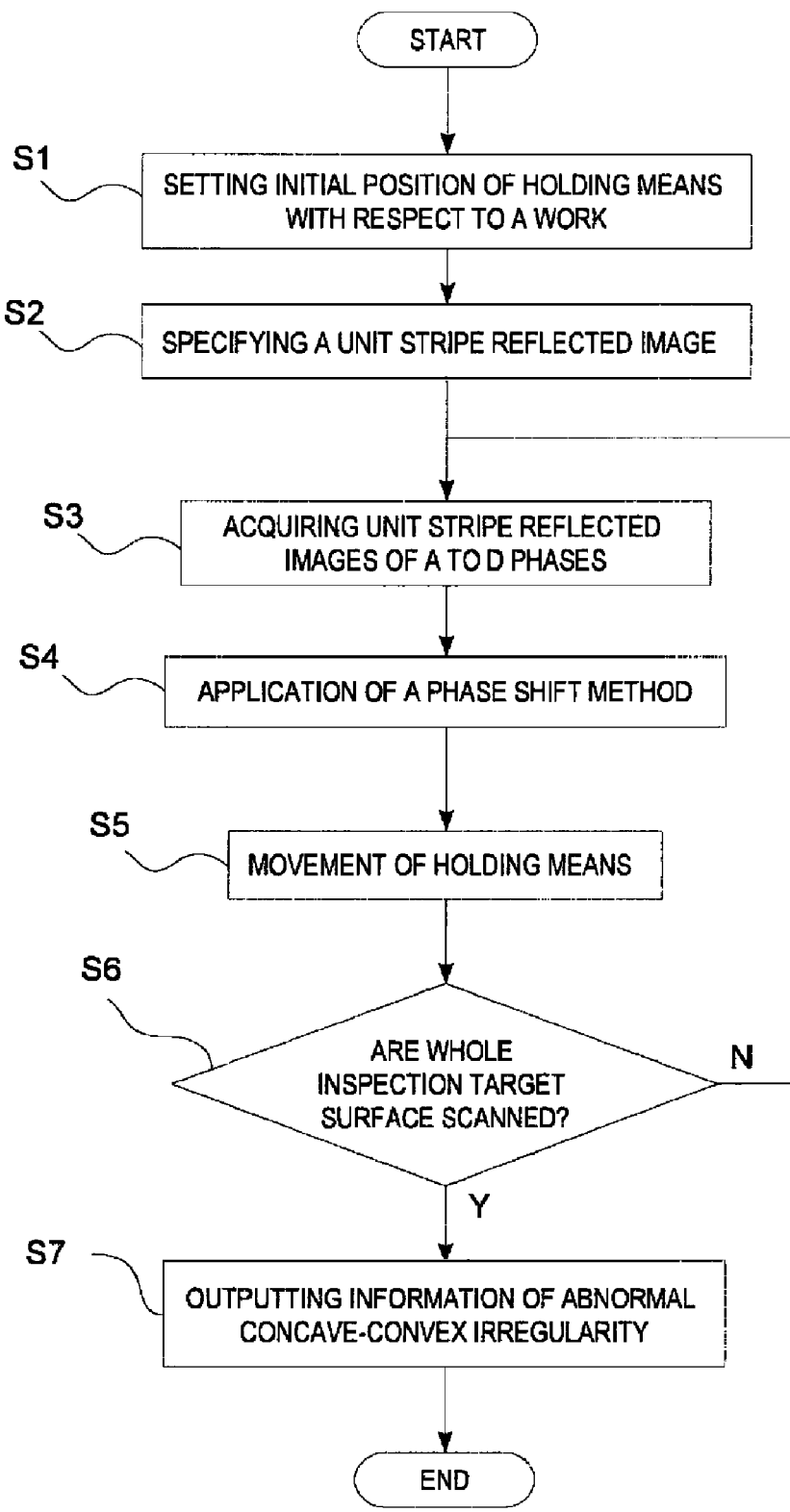
FIG. 6 is a flow chart of an operation in the embodiment of FIG. 1.

Initially, the relative position setting part 31 controls the holding means 4 automatically, or based on an input of instructions made by an operator, to position the holding means 4 so that an optical axis of the image detection means 2 is substantially coincident with a non-curved direction of the inspection target surface SP in the workpiece W in a plan view, as indicated at S1 of FIG. 6. Also, a spaced distance between the inspection target surface SP and the frame body 41 is adjusted and fixed in position so that at least a part of the stripe pattern 5 is reflected on the inspection target surface SP and detected by the image detection means 2. Further, the display part 1 is arranged so that an extending direction of the stripe pattern 5 is generally in parallel (i.e., horizontal in this case) to the inspection target surface SP (Step S1, Relative Position Setting Step).

Figure 5:
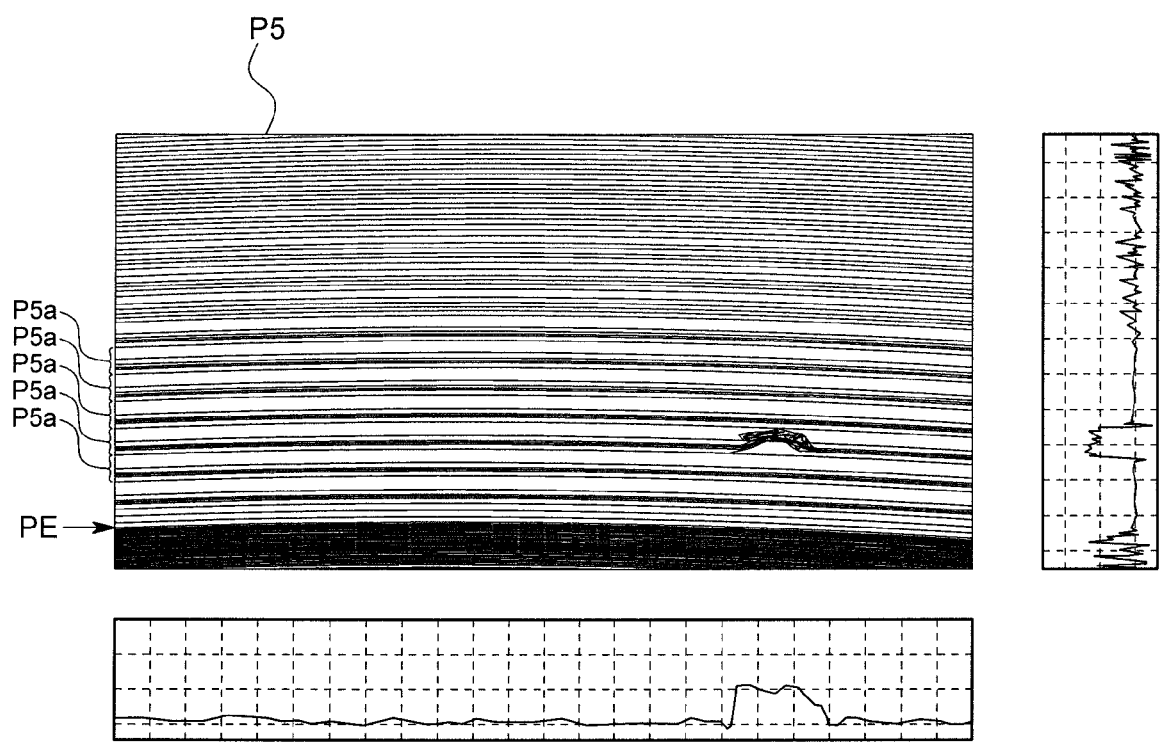
FIG. 5 is a schematic diagram showing a reflected image in the embodiment of FIG. 1.

At this time, incident angles of the lights from the respective unit stripes 5a to be captured by the image detection means 2 are different, as shown in FIG. 3. That is, as the stripe pattern 5 is closer to the inspection target surface SP, the light is reflected by the inspection target surface SP at a shallower angle (i.e., corresponding to a larger incident angle). Therefore, since a reflectance of the light reflected by the inspection target surface SP is theoretically increased as the angle of the reflected light becomes shallower, it is expected that a lower edge portion of the detected image P5 (shown in FIG. 5) in a side closer to the inspection target surface SP of the stripe pattern 5 reflected on the inspection target surface SP becomes most clear. The detected image P5 of the reflected stripe pattern 5 is also referred to as "stripe pattern reflected image P5" hereinafter, and FIG. 5 shows an example image diagram thereof.

However, in some cases, the reflected image of one to several lines of the unit stripes 5a closest to the edge portion may be practically unclear due to influences of light diffracted from a surrounding rear portion of the display part 1 and a delicate curve of the inspection target surface SP and the like.

Therefore, in the present embodiment, the specifying part 32 specifies a reflected image P5a of one or more continuous unit stripes 5a beginning from an inner portion inner of the edge PE of the reflected image P5 of the stripe pattern 5 by constant pixels or more, and further, the image data is stored in a prescribed region of the memory (Step S2: Specifying Step). An image of unit stripes reflected on the inspection target surface is also referred to as "unit stripes reflected image P5a" hereinafter. At this time, region data indicative of a position where the unit stripe 5a is reflected on the inspection target surface SP is also stored in the memory in association with the unit stripes reflected image P5a. Regarding the position of the edge PE of the reflected image P5 of the stripe pattern 5, the specifying part 32 automatically recognizes the position utilizing the fact that the outer side thereof becomes a monotonous image of little-changing light intensity.

Meanwhile, the display part 1 is independently and movably supported by the holding means 4. For example, the display part 1 may be slidably held by the frame body 41 via a driving motor and the like. Thus, upon receipt of a command signal from the phase shifting part 33, the display part 1 may be minutely moved in a widthwise direction of the stripe pattern 5 thereof so that a position of the stripe pattern 5 reflected on the inspection target surface SP is shifted by ¼ period in each period. Then, the unit stripes reflected image P5a in each of four phases (e.g., A phase, B phase, C phase and D phase) in each period including a first obtained unit stripes reflected image P5a is stored in a prescribed region of the memory (Step S3: Phase Shift Step).

Next, the image processing part 34 applies a phase shift method to the data of the unit stripes reflected image P5a associated with the A to D phases to thereby calculate information related to the position and size of the abnormal concave-convex irregularities (Step S4).

In a right side portion and a lower side portion of the stripe pattern reflected image P5, FIG. 5 illustrates graphs as an example of the calculated results by applying the phase shift method, respectively. An abnormally changing portion in each of the graphs shows an abnormal concave-convex irregular region. It is found that noise increases in a region other than the portion of the unit stripes reflected images P5a and it may be difficult to specify the abnormal concave-convex irregularity there.

Next, the holding means 4 is moved (Step S5) to acquire the stripe pattern reflected image P5. At this time, in specifying the unit stripes reflected image P5a, the holding means 4 is moved so that the reflected region on the inspection target surface SP of the unit stripes reflected image P5a is situated adjacent to the reflected region of the reflected image P5a of the last specified unit stripe reflected on the inspection target surface SP. Then, the process returns to Step S3 again.

This operation is repeated to scan the whole region of the inspection target surface SP to be covered with the unit stripes reflected images P5a (Step S6). Once the entire region of the inspection target surface is scanned, the method of FIG. 6 proceeds to S7, wherein the image processing part 34 outputs information of the positions and sizes of the abnormal concave-convex irregularities in the whole inspection target surface SP.

It should be appreciated that the above description is only one embodiment of the present invention, and the present invention is, of course, not limited to this embodiment.

For example, it is possible to apply various methods, such as the bright and dark alternation and the phase shift method. As to the phase shift method, a three-phase system may be adapted.

Figure 7:
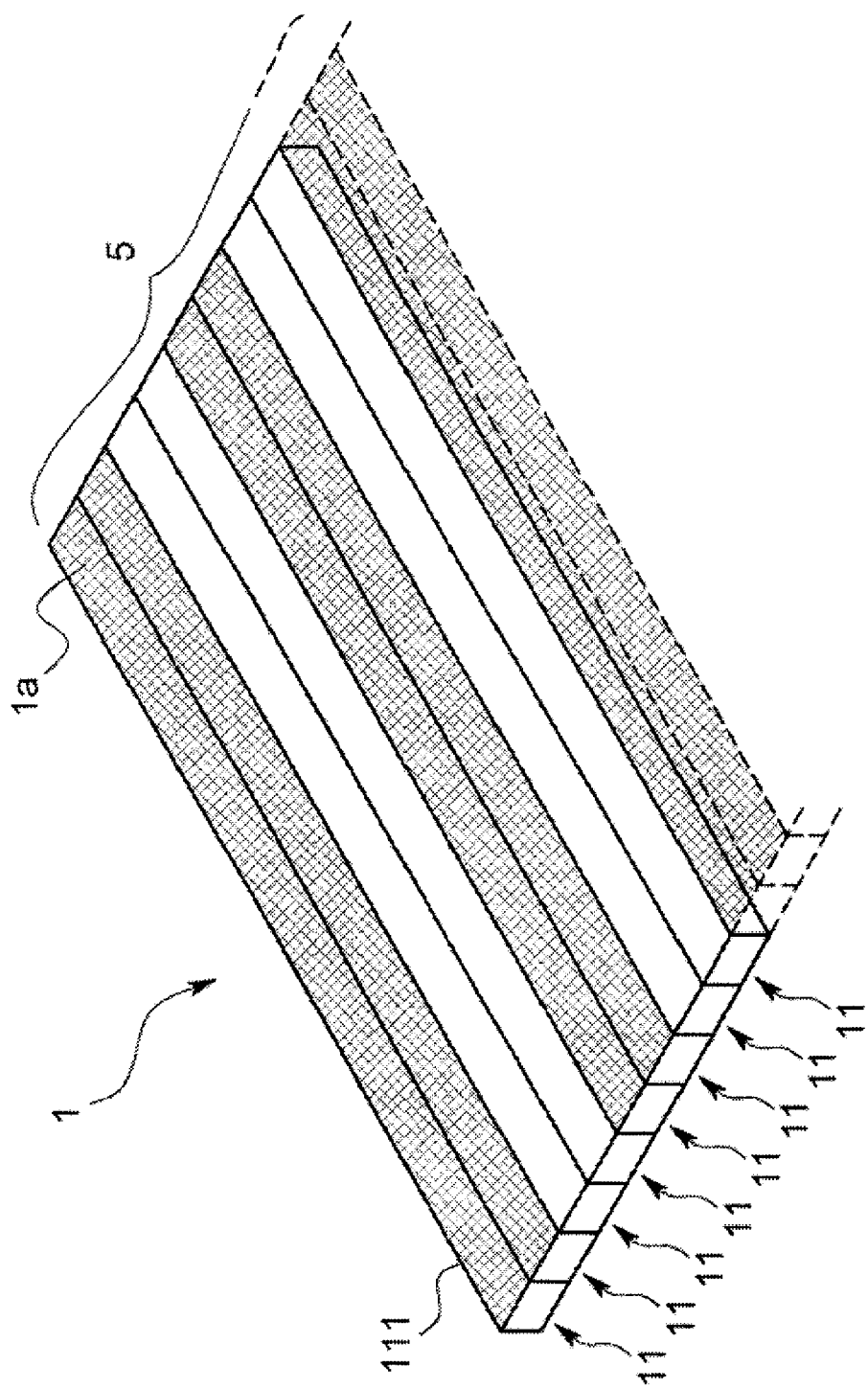
FIG. 7 is a perspective view of a display part according to another embodiment of the present invention.
Figure 8:
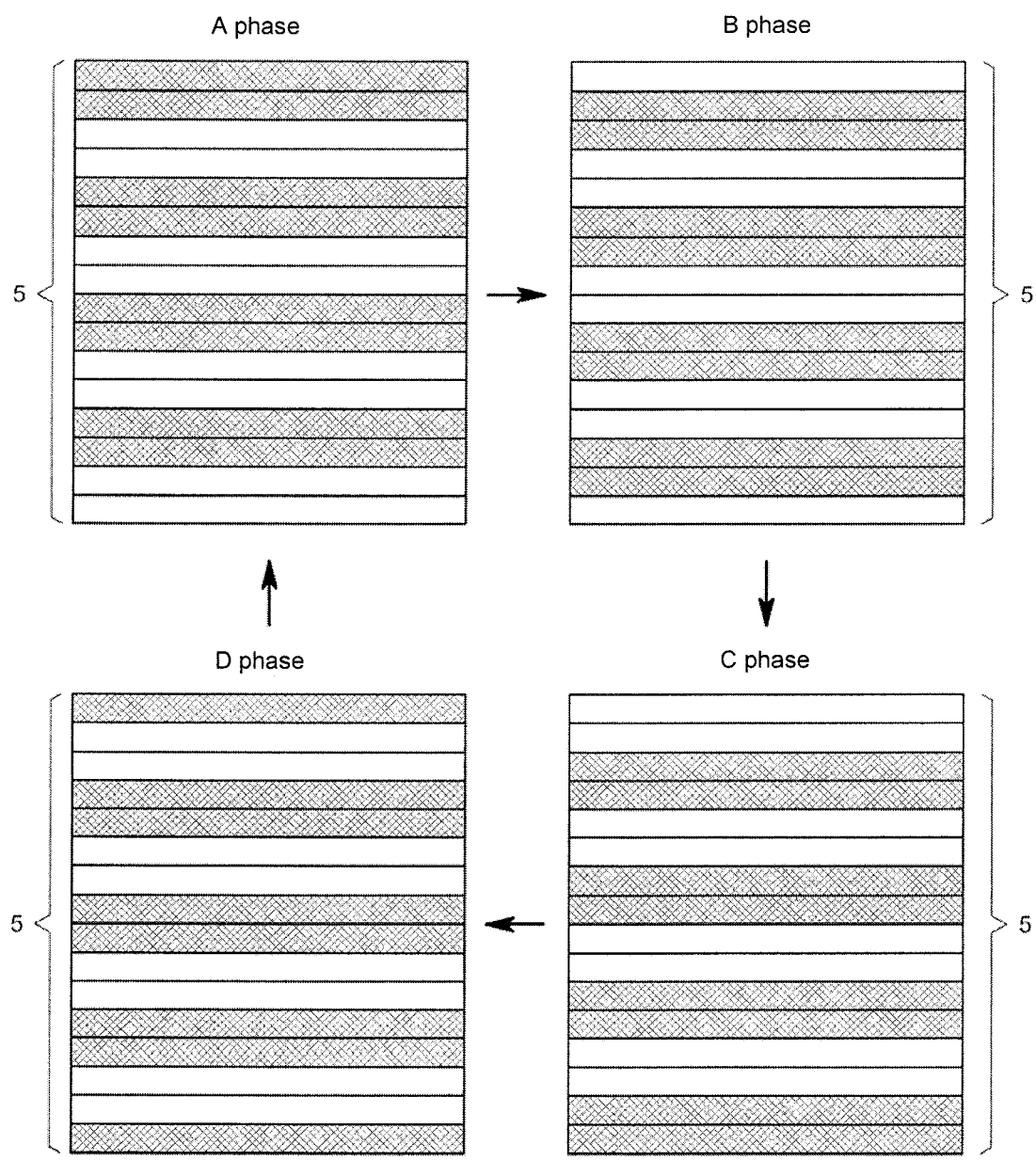
FIG. 8 is a phase-shifting image of the display part.

Further, a modified example of the display part is shown in FIGS. 7 and 8. In this arrangement, the display part 1 is constructed by arranging a plurality of bar-shaped LEDs 11 in parallel. Each of the bar-shaped LEDs 11 includes, for example, a plurality of continuous long rectangular casings 111 arranged in a longitudinal direction and a plurality of LED chips (not shown) arranged in a longitudinal direction thereof inside the casings 111, wherein a light transmission dispersion plate is provided on one surface of each casing 111 so that the one surface serves as a linear light emitting plane 1a.

Then, upon receipt of the command signal from the phase shift part, the bar-shaped LEDs 11 are periodically blinked in a unit comprising n pieces, wherein n is an integer of two or more, for example. Thus, as shown in FIG. 8, the sinusoidal waveform or rectangular waveform stripe pattern 5 formed on the plurality of light emitting planes 1a arranged in parallel is phase-shifted so that the position of the stripe pattern 5 reflected on the inspection target surface SP is shifted by 1/n periods in each period.

Further, the angle defined by the inspection target surface and the image detection means is preferably 10 degrees or smaller in the case of a resin injection-molded part, and preferably 5 degrees or smaller, more preferably 2 to 3 degrees, in the case of a steel plate.

In order to detect a curved direction, there may be considered a method such that the highest level portions in gradation (e.g., white portions) of the reflected sine waves of the A to D phases are acquired to extract a curved line of one array, and a method such that a plane shape is previously acquired by a laser beam cutting method so that a position at which a regular reflection occurs most easily is obtained to thereby extract a curved line of one array.

In the case where a curved portion of the inspection target surface is formed in multiple directions, the display part may be arranged in a manner such that an extending direction of the unit stripe reflected on the inspection target surface is substantially perpendicular to a direction which includes a least curved portion.

As to what portion of the unit stripes reflected image counting from the edge of the stripe pattern should be specified, although a constant number of unit stripes reflected images internally positioned by a predetermined constant number of pixels are used in the present embodiment, this may be automatically decided for every image detection operation. More specifically, there may be considered a configuration that, for example, the specifying part executes a bright and dark binarization process of the image to thereby specify the reflected images of one or more continuous unit stripes of a plurality of unit stripes to be displayed more clearly above a predetermined level.

It is noted that the present invention should not be limited to the embodiments mentioned above, and various changes within the scope are possible without departing from the spirit of the invention.

REFERENCE SIGNS LIST

100 . . . Inspecting system
1 . . . Display part
2 . . . Image detection means
31 . . . Relative position setting part
32 . . . Specifying part
33 . . . Phase shifting part
34 . . . Image processing part
4 . . . Holding means
5 . . . Stripe pattern
5a . . . Unit stripe
P5 . . . Stripe pattern reflected image
P5a . . . Unit stripes reflected image
PE . . . Edge
W . . . Workpiece
SP . . . Inspection target surface

The invention claimed is:

1. An inspecting system for inspecting abnormal concave-convex irregularities in an inspection target surface defined in a surface of a workpiece, comprising:
  a display part adapted to display a stripe pattern of periodically continuous unit stripes, each unit stripe being formed of linear bright and dark portions having a constant width;

image detection means adapted to detect the stripe pattern reflected on the inspection target surface;

holding means adapted to hold the display part so that an extending direction of the unit stripes is substantially in parallel to the inspection target surface and to hold the image detection means so that an optical axis of detecting an image is diagonal to the inspection target surface;

a relative position setting part adapted to drive the holding means or the workpiece to change a relative position thereof to be multiple;

a specifying part adapted to specify a unit stripes reflected image, which is a reflected image of one or more continuous unit stripes, selected among reflected images existing in a predetermined distance range counted from an edge in a closer side to the workpiece in a stripe pattern reflected image which is a reflected image of the stripe pattern in each of the relative positions;

a phase shifting part adapted to shift a reflected position of the stripe pattern reflected on the inspection target surface by 1/n periods when viewed from the image detection means in each of the relative positions, wherein n is an integer of two or more; and an image processing part adapted to determinably output abnormal concave-convex irregularities within the inspection target surface based on the unit stripes reflected image in each phase in each of the relative positions, wherein the relative position setting part sets each of the relative positions so as to cover the inspection target surface with the unit stripes reflected image specified in each of the relative positions.

2. The inspecting system according to claim 1, wherein the phase shifting part is adapted to shift the reflected position of the stripe pattern reflected on the inspection target surface by 1/n periods by changing a position of the image detection means or the display part, wherein n is an integer of two or more.

3. The inspecting system according to claim 1, wherein the display part is adapted to have a plurality of arrays of light emitting elements to set bright and dark patterns of the light emitting elements in every array thereby to display the stripe pattern, whereby the phase shifting part is adapted to shift the reflected position of the stripe pattern reflected on the inspection target surface by 1/n periods by periodically changing the bright and dark patterns of the light emitting elements in time basis in every array, wherein n is an integer of two or more.

4. The inspecting system according to claim 1, wherein a brightness of the bright and dark portions in the stripe pattern is varied in a manner of a sinusoidal waveform in a widthwise direction, and the phase shifting part shifts the reflected position of the sinusoidal waveform stripe pattern by ¼ periods to be varied to four phases of an A phase, a B phase, a C phase and a D phase in each period.

5. The inspecting system according to claim 1, wherein an angle defined by the inspection target surface and the optical axis of detecting the image of the image detection means is 10 degrees or smaller.

6. The inspecting system according to claim 1, wherein the inspection target surface has a curved surface and an extending direction of the unit stripe reflected on the inspection target surface is perpendicular to a non-curved direction in the curved surface.

7. The inspecting system according to claim 1, wherein the specifying part specifies the unit stripes reflected image of one or more continuous unit stripes of a plurality of unit stripes to be displayed more clearly above a predetermined level.

8. An inspecting method of inspecting abnormal concave-convex irregularities in an inspection target surface defined in a surface of a workpiece, wherein: a display part is adapted to display a stripe pattern of periodically continuous unit stripes each of which is formed of linear bright and dark portions having a constant width; an image detection means is adapted to detect the stripe pattern reflected on the inspection target surface; and a holding means is adapted to hold the display part so that an extending direction of the unit stripes is substantially in parallel to the inspection target surface and to hold the image detection means so that an optical axis of detecting the image is diagonal to the inspection target surface, the method comprising:

setting a relative position to drive the holding means or the workpiece to change the relative position thereof to be multiple;

specifying a unit stripes reflected image of one or more continuous unit stripes selected among reflected images existing in a predetermined distance range counted from an edge in a closer side to the workpiece in a stripe pattern reflected image in each of the relative positions;

phase shifting a reflected position of the stripe pattern reflected on the inspection target surface by 1/n periods when viewed from the detection means in each of the relative positions, wherein n is an integer of two or more; and performing image processing to determinably output abnormal concave-convex irregularities within the inspection target surface based on the unit stripes reflected image in each phase in each of the relative positions, wherein setting the relative position comprises setting each of the relative positions so as to cover the inspection target surface with the unit stripes reflected image specified in each of the relative positions.

9. The inspecting method according to claim 8, wherein phase shifting the reflected position of the stripe pattern reflected on the inspection target surface by 1/n periods comprises changing a position of the image detection means or the display part, wherein n is an integer of two or more.

10. The inspecting method according to claim 8, wherein the display part is adapted to have a plurality of arrays of light emitting elements to set bright and dark patterns of the light emitting elements every array thereby to display the stripe pattern, whereby, phase shifting the reflected position of the stripe pattern reflected on the inspection target surface by 1/n periods comprises periodically changing the bright and dark patterns of the light emitting elements in time basis every array, wherein n is an integer of two or more.

* * * * *